United States Patent
Kallas et al.

(10) Patent No.: US 11,384,834 B2
(45) Date of Patent: Jul. 12, 2022

(54) SYSTEMS AND METHODS FOR BYPASS OF HYDRAULIC CHARGE CIRCUITS

(71) Applicant: Clark Equipment Company, West Fargo, ND (US)

(72) Inventors: Douglas Kallas, Mandan, ND (US); Charles Young, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 0 days.

(21) Appl. No.: 17/129,086

(22) Filed: Dec. 21, 2020

(65) Prior Publication Data

US 2021/0189692 A1    Jun. 24, 2021

Related U.S. Application Data

(60) Provisional application No. 62/951,122, filed on Dec. 20, 2019.

(51) Int. Cl.
| | |
|---|---|
| *E02F 9/22* | (2006.01) |
| *F16H 61/4139* | (2010.01) |
| *F16H 61/4043* | (2010.01) |
| *F15B 21/0423* | (2019.01) |
| *F15B 13/04* | (2006.01) |

(52) U.S. Cl.
CPC ......... *F16H 61/4043* (2013.01); *E02F 9/226* (2013.01); *E02F 9/2282* (2013.01); *F15B 13/04* (2013.01); *F16H 61/4139* (2013.01); *F15B 21/0423* (2019.01)

(58) Field of Classification Search
CPC .. F16H 61/4043; F16H 61/4139; E02F 9/226; F15B 21/0423
See application file for complete search history.

(56) References Cited

U.S. PATENT DOCUMENTS

| | | | |
|---|---|---|---|
| 4,017,221 A | | 4/1977 | Dezelan |
| 4,373,869 A | * | 2/1983 | Martin .................. F04B 49/24 417/213 |

(Continued)

FOREIGN PATENT DOCUMENTS

| | | |
|---|---|---|
| DE | 102009049995 A1 | 4/2011 |
| EP | 1172588 A2 | 1/2002 |

(Continued)

OTHER PUBLICATIONS

International Searching Authority. International Search Report and Written Opinion for application PCT/US2020/066392, dated Apr. 6, 2021. 15 pages.

*Primary Examiner* — Michael Leslie

(57) ABSTRACT

A control system for a hydrostatic drive system can include a hydraulic charge pump circuit having a hydraulic load and a tank. The hydraulic charge pump can be in fluid communication with the hydraulic charge pump circuit. A bypass line can extend to the tank from a junction between the hydraulic charge pump and the hydraulic load. A charge bypass valve can be disposed to control flow through the bypass line. The control system can include a control device configured to determine one or more operational parameters for the power machine and control the charge bypass valve to allow flow through the bypass line, from the hydraulic charge pump to the tank, based on the determined operational parameters during a starting operation.

18 Claims, 10 Drawing Sheets

(56) References Cited

U.S. PATENT DOCUMENTS

| | | | |
|---|---|---|---|
| 4,624,333 A | | 11/1986 | Minor |
| 4,951,466 A | * | 8/1990 | Macht ................ F16H 61/4043 60/329 |
| 5,564,274 A | | 10/1996 | Denbraber |
| 6,453,668 B1 | | 9/2002 | Johnson |
| 6,463,893 B1 | | 10/2002 | Foster |
| 6,966,180 B2 | | 11/2005 | Deneir |
| 8,096,781 B2 | | 1/2012 | Nelson et al. |
| 8,234,860 B2 | | 8/2012 | Beschorner et al. |
| 8,269,360 B2 | * | 9/2012 | Boisvert ................ F15B 7/008 290/43 |
| 8,555,843 B2 | | 10/2013 | Klouisa |
| 8,899,031 B2 | | 12/2014 | Turnis |
| 9,026,255 B2 | * | 5/2015 | Turnis ................ F15B 20/008 700/276 |
| 9,803,665 B2 | | 10/2017 | Beschorner |
| 9,890,847 B2 | | 2/2018 | Gardner |
| 2010/0097040 A1 | | 4/2010 | Boisvert |
| 2016/0230785 A1 | | 8/2016 | Boisvert |

FOREIGN PATENT DOCUMENTS

| | | |
|---|---|---|
| FR | 3037630 A1 | 12/2016 |
| FR | 3075279 A1 | 6/2019 |

* cited by examiner

SYSTEMS AND METHODS FOR BYPASS OF HYDRAULIC CHARGE CIRCUITS

CROSS REFERENCE TO RELATED APPLICATIONS

This application claims priority to U.S. provisional patent application No. 62/951,122, filed Dec. 20, 2019, the entirety of which is incorporated herein by reference.

BACKGROUND

This disclosure is directed toward power machines. More particularly, this disclosure relates to hydraulic systems, such as hydrostatic drive systems and hydraulic charge systems for power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Conventional hydrostatic drive systems are used to provide tractive power for power machines for travel over terrain. To ensure a proper supply of hydraulic fluid at inlets to drive pumps of a hydrostatic drive system, and to counteract leakage of hydraulic fluid, a hydraulic charge pump can be provided. A hydraulic charge pump, as driven by an engine of a power machine, can pump hydraulic fluid from a reservoir into a hydrostatic drive circuit to make up for leakage and to prime a drive pump, and can also power other equipment, such as a fan motor.

The discussion above is merely provided for general background information and is not intended to be used as an aid in determining the scope of the claimed subject matter.

SUMMARY

Some embodiments of the present disclosure provide systems (and corresponding methods) to control the flow of hydraulic fluid for a charge circuit of a hydrostatic drive system. More specifically, a controllable bypass value can be included within a charge circuit for a hydrostatic drive system to selectively divert hydraulic flow back to a tank, depending on current and historical operating conditions. In some implementations, this can allow hydraulic flow from a hydraulic charge pump to be temporarily diverted directly to the tank, rather than passing through a hydraulic load or charging a hydrostatic drive circuit and can thereby temporarily reduce engine load during a starting operation (i.e., during "startup" of the power machine). For example, a bypass valve can be activated to bypass a hydraulic load based on operational parameters that indicate low ambient or system temperatures, low engine speeds, large amounts of elapsed time since a previous run cycle, or different permutations of these or other decision inputs.

Some of the disclosed embodiments provide a power machine that includes an engine. A hydrostatic drive system can include a hydraulic charge pump circuit that includes a hydraulic load and a tank. A hydraulic charge pump can be in fluid communication with the hydraulic charge pump circuit. A bypass line can extend to the tank from a junction between the hydraulic charge pump and the hydraulic load. A charge bypass valve can be arranged to control flow through the bypass line. A control system can include a control device configured to determine an engine speed for the engine and to control the charge bypass valve to allow flow through the bypass line, from the hydraulic charge pump to the tank, based on the engine speed being below a speed threshold.

Some of the disclosed embodiments provide a control system for a hydrostatic drive system, for use in a power machine with an engine. The hydrostatic drive system can include a hydrostatic drive pump and a hydraulic charge pump circuit that includes a hydraulic load and a tank, a hydraulic charge pump in fluid communication with the hydraulic charge pump circuit, a bypass line extending to the tank from a junction between the hydraulic charge pump and the hydraulic load, and a charge bypass valve arranged to control flow through the bypass line. The control system can include a control device that is configured to determine one or more operational parameters for the power machine. The control device can be further configured to, during a startup of the engine, control the charge bypass valve to allow flow through the bypass line, to bypass the hydraulic load and the hydrostatic drive pump, for a flow from the hydraulic charge pump to the tank, based on the determined one or more operational parameters.

Some of the disclosed embodiments provide a method for controlling a bypass flow for a hydraulic charge pump circuit of a power machine. Using a control device, one or more operational parameters for the power machine can be determined. During a startup of the power machine, a charge bypass valve can be controlled, based on the one or more operational parameters, to temporarily route a hydraulic flow from a hydraulic charge pump through a bypass line to a tank, to reduce hydraulic flow from the hydraulic charge pump to a hydrostatic drive system of the power machine.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
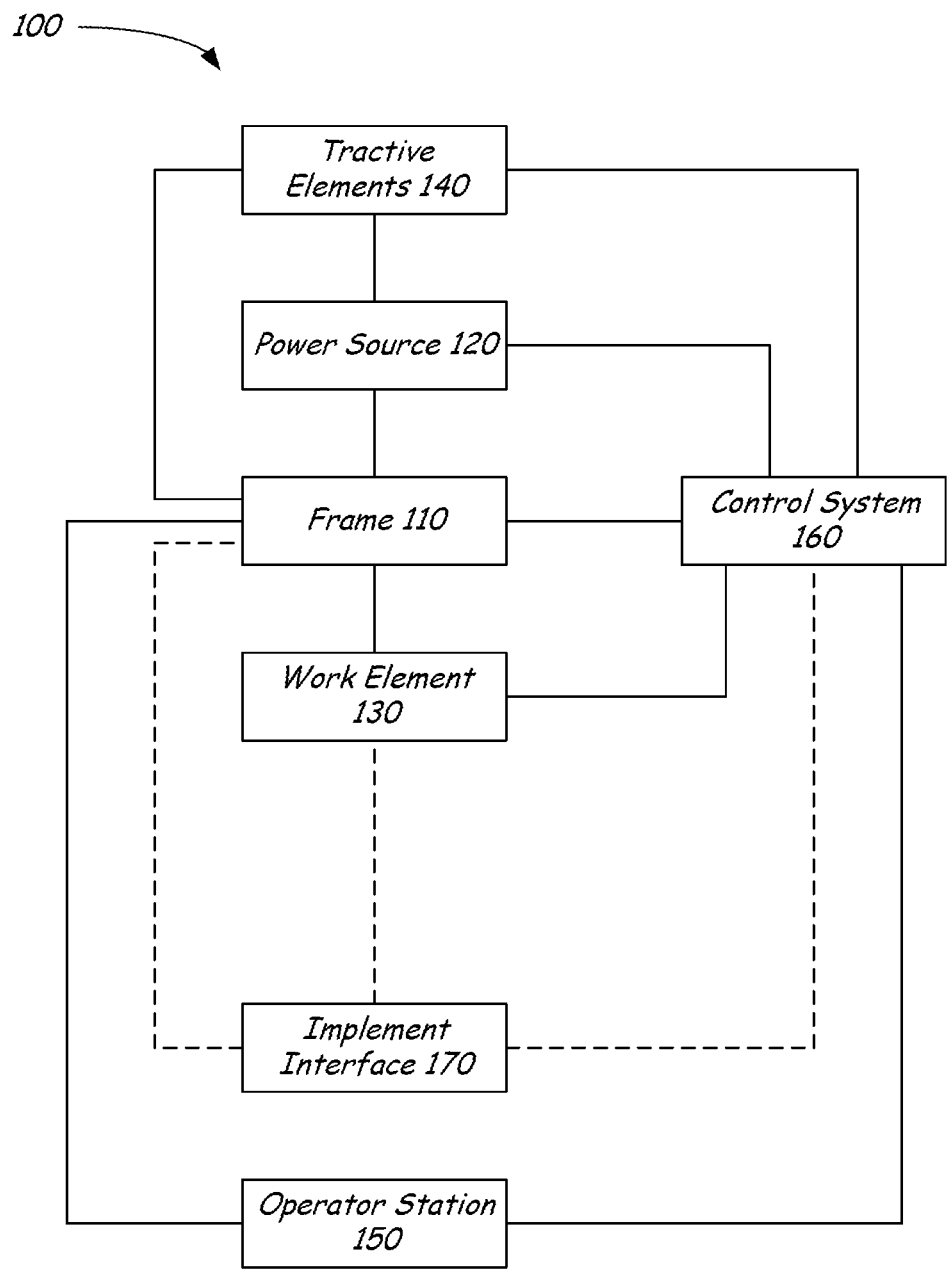
FIG. 1 is a block diagram illustrating functional systems of a representative power machine on which embodiments of the present disclosure can be advantageously practiced.

The concepts disclosed in this discussion are described and illustrated by referring to exemplary embodiments.

These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items. Further, the term "threshold" as used herein, unless otherwise specified, is meant to include a single numerical value (e.g., exact value, average value, etc.), a discrete number of multiple numerical values, inclusive ranges of values, or exclusive ranges of values, as appropriate.

As noted above, power machines (e.g., skid-steer loaders) can include hydrostatic drive systems for propulsion of the power machine. Hydrostatic drive circuits for such systems are typically closed loop circuits, but hydrostatic pumps and motors tend to leak internally, with leakage being directed back to a hydraulic tank via a case drain. In addition, a flushing valve may be provided to provide a path for fluid out of the closed loop and through a hydraulic cooler to cool the fluid. To counteract this leakage and flow out of the flushing valve, a hydraulic charge pump can be configured to pump fluid from a reservoir (i.e., "tank") through a hydrostatic charge circuit that is configured to replenish the hydrostatic drive loop. As appropriate, the hydraulic charge pump can also provide hydraulic power to a hydraulic load such as a fan motor, a charge relief valve, or other equipment. The use of a hydraulic charge pump can thus ensure that there is enough fluid and pressure within a hydrostatic drive circuit as well as assist with thermal management for a power machine or other functionality.

Correspondingly, not operating a hydraulic charge pump even for short periods of time can lead to damage to components within a hydrostatic drive circuit (or other components) or otherwise sub-optimal performance of a power machine. To avoid this problem, hydraulic charge pumps are generally configured to continually run while a power machine is operating, from the moment that the engine is first capable of driving the hydraulic charge pump. One conventional implementation to address these needs is to configure a hydraulic charge pump as a constant displacement hydraulic pump that is directly or operably (such as via a belt drive) coupled to an output shaft of an engine. Accordingly, the hydraulic charge pump can operate whenever the engine is also operating.

With such arrangements, however, operation of the hydraulic charge pump under some conditions can result in excessive loading of an engine during starting sequences for the engine and the power machine in general (i.e., during startup of the engine or power machine), which may prevent or otherwise adversely affect a successful starting event. This may be particularly true, for example, when starting an engine in a cold environment, after the engine has not been operated for a relatively long period of time, such that the hydraulic fluid is at a low temperature (for example, below 10 degrees Celsius). Although extended time in a cold environment may be particularly notable, other conditions can also result in similar excessive loading of an engine during startup.

Accordingly, it may be useful to provide a system that can allow continuous operation of a hydraulic charge pump during operation of an engine, while selectively reducing engine loading from the hydraulic charge pump based on temperature or other operational parameters. Some embodiments of the disclosure can address this need, or others, to provide improvements over conventional hydraulic charge systems for hydrostatic drive circuits. For example, a bypass line can be arranged to branch from a hydraulic charge pump circuit between a hydraulic charge pump and a load on the hydraulic charge pump (which would include the provision of hydraulic fluid the hydraulic drive circuit), to provide a flow path from the hydraulic charge pump circuit to a hydraulic fluid tank. In some embodiments, a bypass valve is arranged to control flow to the bypass line and is selectively activatable to route flow from the hydraulic charge pump through the bypass line and to the tank or any suitable low pressure drain (including back to the hydraulic charge pump inlet), thereby temporarily bypassing the load to thereby reduce the overall load on the engine. In particular, such a bypass valve can be configured to allow flow through a bypass line only when certain operational conditions are satisfied.

Generally, a bypass valve can be controlled based on any number of operational parameters of the power machine. In some embodiments, a bypass valve can be controlled based on one or more intrinsic operational parameters (e.g., temperatures, states, signals, etc. of the power machine itself). In some embodiments, a bypass valve can be controlled based on one or more extrinsic operational parameters (e.g., ambient environmental conditions or other parameters external to the power machine). In some embodiments, a bypass valve can be controlled based on a combination one or more extrinsic operational parameters and one or more intrinsic operational parameter.

Control of bypass flow based on one or more of intrinsic or extrinsic temperature, operating (or non-operating) intervals for a power machine or engine, or engine speed can be particularly useful in some cases, including during startup of an engine of a power machine. For example, a bypass valve can be controlled to temporarily bypass the load in a charge circuit upon startup of based on a sensed ambient temperature (e.g., as determined by a temperature sensor), which may advantageously serve as a proxy for a temperature of hydraulic fluid for a power machine. More specifically, the lower the ambient temperature, the higher the likelihood that the hydraulic fluid temperature is also low. As detailed above, as the hydraulic fluid temperature decreased, the hydraulic fluid becomes more viscous. This increases the loading on the hydraulic charge pump and, correspondingly, also on the engine, particularly when the hydraulic charge pump is also used to power other hydraulic working components (e.g., a fan motor). Thus, by activating a bypass valve when the ambient temperature is relatively low, hydraulic loading on a hydraulic charge pump can be significantly decreased, which can aid in starting the engine.

As another example, a bypass valve can be controlled to temporarily bypass parts of a charge circuit based on a sensed engine speed (e.g., as determined by a tachometer). For example, during a starting sequence, the engine speed may initially be very low, and sensing engine speed during a start cycle can give some indication as to whether the engine has been successfully started. Accordingly, a sensed engine speed can indicate that an engine has been successfully started and that, correspondingly, the bypass valve should be deactivated.

As a further example, a bypass valve can be controlled to temporarily bypass parts of a charge circuit based on an elapsed time between a current run cycle and a preceding run cycle. More specifically, an elapsed time can be defined as a time interval between an "off" indication of a previous cycle and an "on" indication of a current cycle (e.g., as indicated by states of a "run" switch for a power machine or by operating and non-operating states of an engine). In particular, an elapsed time between previous and current usages can serve as a proxy for a temperature of a hydraulic fluid (or other relevant temperatures). For example, when a power machine operates in relatively cold environments, a relatively long period of time between run cycles may indicate that hydraulic fluid for a power machine is likely to be relatively cold and viscous. Thus, after relatively long elapsed times between current and previous run cycles, it may be useful to control a bypass valve to temporarily reduce engine loading from operation of a hydraulic charge pump during a starting sequence.

In some implementations, a duration of a preceding run cycle can also be considered. For example, a short duration of a preceding run cycle may indicate that an engine has not been run long enough to sufficiently warm up the hydraulic fluid or other relevant systems. Thus, a bypass valve may be controlled to bypass parts of a charge circuit during a starting sequence based on identification of relatively short elapsed times between the preceding run cycle and a current run cycle. In contrast, if a preceding run cycle has a relatively long duration, relevant systems may remain warmer for longer. Accordingly, in some cases, a bypass flow during a starting sequence may be needed only after relatively long elapsed times between preceding and current run cycles.

As another example, the bypass valve can be controlled to bypass parts of a charge circuit based on a duration of a current cranking operation for an engine or activation of an operator-generated crank signal (e.g., activation of a "start engine" button or switch). Both noted operating conditions—as indications that an operator is providing a crank signal or a particular (e.g., extended) duration of a cranking operation—may indicate that the engine is currently being started. It may thus be useful to control a bypass valve at these times, regardless of the status of any other input, to bypass parts of a charge circuit and thereby reduce engine loading. Because damage to components such as the drive pump can occur after only a short period of time, it may be advantageous to limit the bypass time based on the amount of time that has elapsed during a cranking sequence. For example, the bypass time may be limited to only the total elapsed time of a cranking sequence or cranking input, to a maximum total time regardless of elapsed time of a cranking sequence or input, or to a maximum total time beyond the end of a cranking sequence or input.

As a still further example, a bypass valve can be controlled during a starting operation to bypass parts of a charge circuit based on various temperature profiles, including those not relating directly to a temperature of a hydraulic fluid. For example, relevant temperature profiles, as may indicate a temperature range, maximum or minimum temperature value, or sampling of temperatures over a particular time interval, can be determined for an engine coolant, for ambient air, or for one or more components of the power machine. In some cases, control of a bypass valve based on a temperature profile can allow a more nuanced management of bypass flow than measurement of a single current temperature. For example, if an ambient temperature was recently relatively cold for an extended time, it may be appropriate to bypass parts of a charge circuit during a starting operation even if a current ambient temperature is relatively warm. In contrast, if an ambient temperature is currently relatively cold, but the ambient temperature was recently relatively warm for an extended time, bypass flow may not be needed.

In some embodiments, multiple operational parameters relating to a power machine can be considered in combination to control operation of a bypass valve during a starting operation. For example, some implementations may control a bypass valve based on different combinations of temperatures, engine speeds or operational states, time durations or intervals relating to preceding or current run cycles, and so on.

In some embodiments, approaches as generally discussed above can appropriately manage the interrelated effects of different operational parameters. For example, control of a bypass valve based on an ambient temperature being below a specific threshold, a speed of an engine being below a specific threshold, and an elapsed time between previous and current run cycles being above a specific threshold can provide control that accounts for the interrelated effects of ambient temperature, heating of an engine and hydraulic fluid during a previous run cycle, cooling of an engine and hydraulic fluid before a current starting operation, and the available torque and power of the engine at the current operating speeds. In this regard, although an ambient temperature may be relatively low, if an elapsed time between run cycles is relatively short then hydraulic fluid may have retained enough heat to retain sufficiently low viscosity and substantial bypass flow may not be needed. In contrast, if ambient temperatures are relatively low, and an elapsed time between run cycles is relatively long, then hydraulic fluid may not have retained enough heat to retain sufficiently low viscosity and more substantial bypass flow may be needed.

In some embodiments, temporary bypass flow may be maintained only for a predetermined amount of time, only during one or more initial stages of startup for a power machine, or based on other considerations. For example, in some cases, a bypass flow may be maintained only for a predetermined time interval (e.g., 5 seconds, 10 seconds, 30 seconds, or an interval between any of those endpoints). As another example, in some cases, a bypass flow may be maintained only for a time interval that can be determined based on other parameters (e.g., a longer time to correspond to colder ambient or power machine temperatures or to longer durations between run cycles). In some cases, a bypass flow may be maintained only until other conditions are met. For example, as also noted above, a bypass flow may be maintained only until an engine speed reaches a particular threshold (e.g., 900 RPM), a cranking input from an operator ceases, or another operational parameter is satisfied (or not).

As used herein "startup" or "starting" sequences or operations of an engine or a power machine generally refer to sequences or operations that are used to bring an engine or power machine from a shut-down or otherwise non-powered state to a fully operational or otherwise powered state. In some cases, a sequence of operations during startup may include an operator providing a crank input to start an engine, followed by a series of electronic or hydraulic checks and control signals that verify the status of relevant system(s), and, eventually, cranking operations that actually start the engine turning so as to eventually provide full power to the power machine. For example, an operator may initiate startup by engaging a start switch or button, to provide an electrical signal to start cranking an engine. This signal may prompt one or more hydraulic or electrical checks of relevant sub-systems, as appropriate, after which a starter motor or other device may crank the engine to start powered engine operation. In other cases, however, other sequences are also possible.

Generally, and as further discussed below, a bypass valve for flow from a hydraulic charge pump can be controlled to allow bypass flow over any of a variety of time intervals during startup. In some cases, it may be particularly useful for the bypass valve to be opened after a cranking signal is received (e.g., via operator input), but before actual cranking of the engine begins. For example, this timing for bypass operations may help to ensure that a path for bypass flow is opened before a hydraulic charge pump receives rotational power from, and imposes a corresponding load on, an engine. Correspondingly, determination and analysis of relevant operational parameters (e.g., as discussed below) may sometimes initially occur before an engine initially begins to operate. In other cases, however, other timing may be used for control of a bypass flow, or for determination and analysis of various operational parameters.

Figure 2:
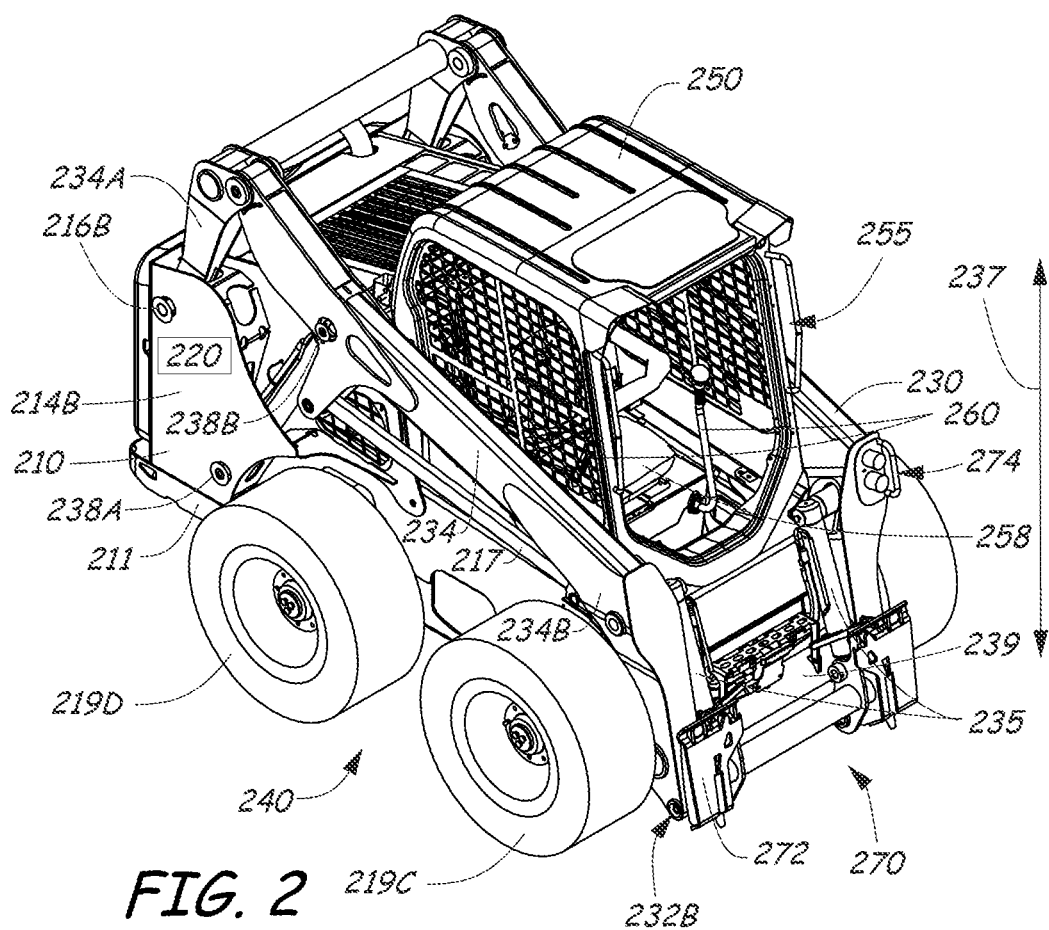
FIGS. 2-3 illustrate perspective views of a representative power machine in the form of a skid-steer loader of the type on which the disclosed embodiments can be practiced.
Figure 3:
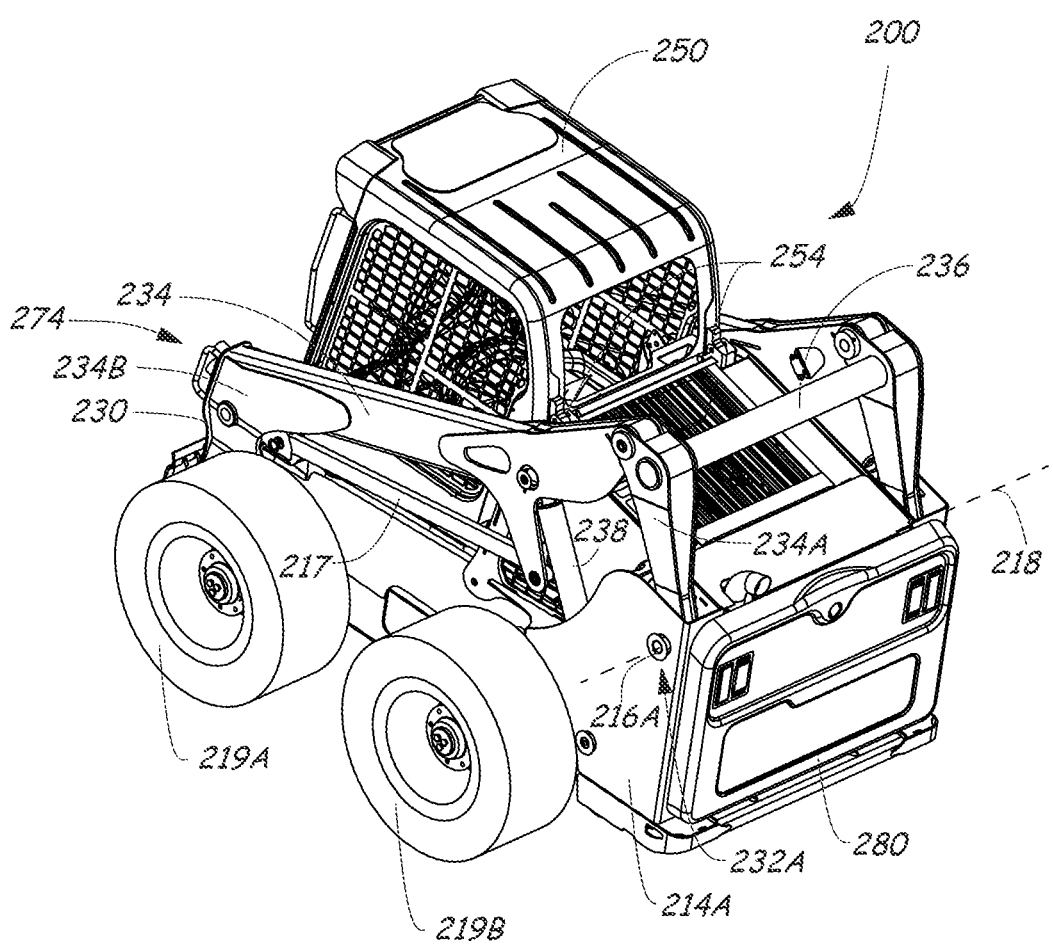

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which it is coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine.

Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that can accept and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
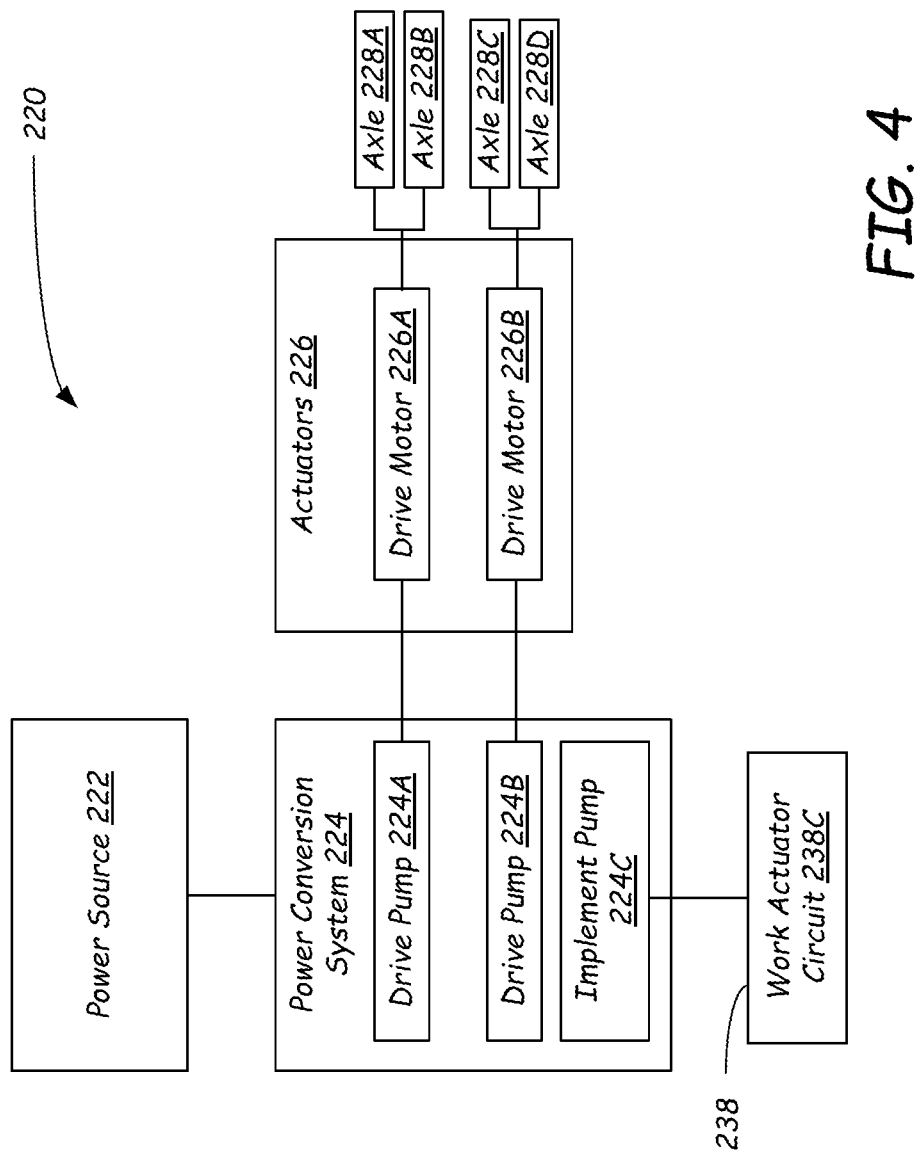
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that can generate and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3-spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
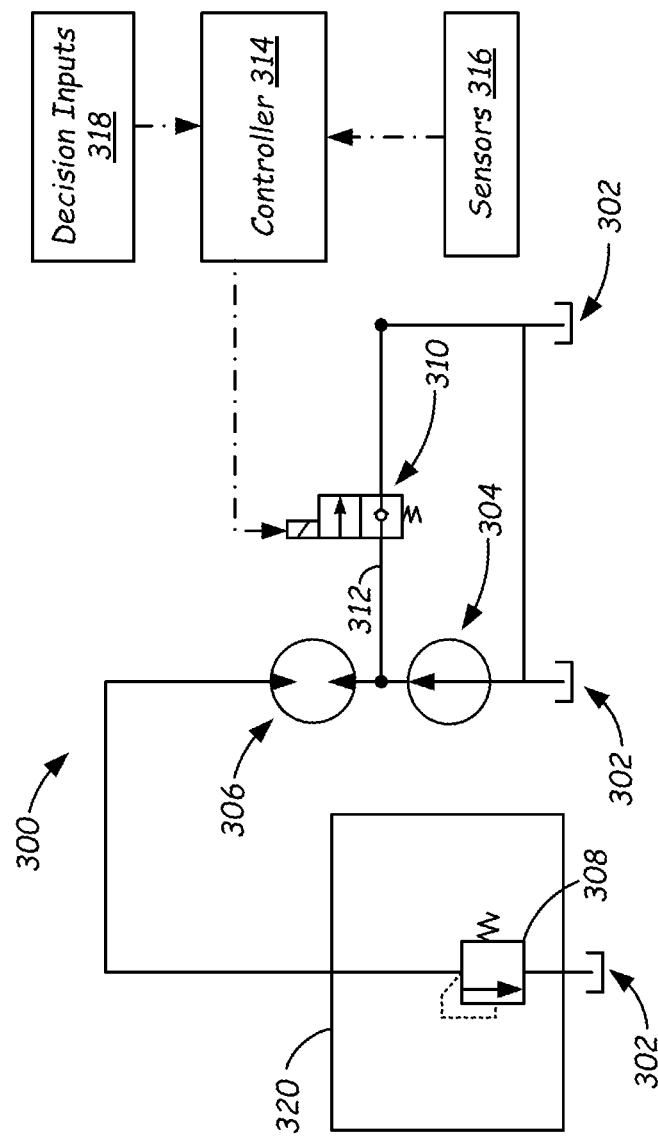
FIG. 5 shows a schematic diagram illustrating a hydraulic charge pump circuit for a power machine, including a charge bypass valve, according to some of the disclosed embodiments.

FIG. 5 shows a schematic diagram illustrating components within a hydraulic charge pump circuit 300 for a power machine. As an example, the following description of the hydraulic charge pump circuit 300 will be discussed with reference to a power machine configured as a loader (e.g., the loader 200). However, it is contemplated that the hydraulic charge pump circuit 300 and associated methods could be implemented on various other power machines. Similarly, the schematic diagram of FIG. 5 may be simplified in various aspects, or may be otherwise varied, relative to different implementations. Accordingly, it should be considered only as an example to demonstrate the general concepts of this disclosure.

Generally, the hydraulic charge pump circuit 300 and the hydrostatic drive circuits form part of a hydrostatic drive system, such as a drive system illustrated schematically in FIG. 4, which is not shown in FIG. 5 for purposes of clarity. Although not shown in detail in FIG. 5, the hydraulic charge pump circuit 300 is in hydraulic communication with one or more hydrostatic drive circuits to ensure that the hydrostatic drive circuits are sufficiently replenished from any losses of flow that might have occurred via internal leakage from drive pumps or motors (as referred to above) or through a controlled loss via a flushing valve.

In different embodiments, hydraulic charge pump circuits can exhibit a variety of different configurations, but generally include a hydraulic charge pump and a charge bypass valve, with the hydraulic charge pump configured to pump hydraulic fluid from a tank to a hydrostatic drive circuit through a hydraulic load (e.g., a fan motor), a charge relief valve, or one or more other hydraulic components. Further, the charge bypass valve is generally configured to selectively route flow from the hydraulic charge pump back to tank, thereby bypassing loads on the hydraulic charge pump, e.g., from a fan motor or other hydraulic components, and also bypassing inlets to the hydrostatic drive circuit. Correspondingly, in the embodiment illustrated, the hydraulic charge pump circuit 300 includes a tank 302, a hydraulic charge pump 304, a fan motor 306, a charge relief valve 308 (e.g., a pressure relief valve) that is configured to set a charge pressure for charging flow into a hydrostatic drive circuit and in some embodiments is located within a hydrostatic drive pump housing 320, a charge bypass valve 310, a controller 314, and one or more sensors 316.

In some embodiments, the controller 314 can be a general-purpose controller, such as may be configured to control operation of various other systems of a power machine (not shown). In some embodiments, the controller 314 can be dedicated exclusively to control one or more aspects of the hydraulic charge pump circuit 300. In some embodiments, the controller 314 can be fully electrical, fully hydraulic, or electro-hydraulic, or can take any variety of other known forms for devices to control operation of one or more components of a power machine. Also as illustrated in FIG. 5, the controller 314 is configured to receive signals corresponding to various decision inputs 318 other than the signals provided by the sensors 316. For example, the controller 314 may receive signals corresponding to operator-provided decision inputs 318, such as may be provided via operator engagement with controls within a cab of the power machine. As also discussed below, the one or more sensors 316 can take a variety of forms, including known configurations of temperature, pressure, flow, current or other sensors, and can be operatively in communication with any variety of components or systems of a power machine as well as the ambient environment.

As illustrated in FIG. 5, the hydraulic charge pump 304 is in fluid communication with the tank 302, and thus draws fluid from the tank 302. The hydraulic charge pump 304 is coupled to an output shaft of a power source such as an engine (not shown), so that rotation of the power source drives the hydraulic charge pump 304 to provide a hydraulic flow to the hydraulic charge pump circuit 300. Typically, the hydraulic charge pump 304 is implemented as a constant displacement pump, such that the rotation of the output shaft proportionally determines the hydraulic flow rate, although other configurations are possible.

Situated downstream from the hydraulic charge pump 304 is a hydraulically powered fan motor 306 that is powered by the hydraulic flow from the hydraulic charge pump 304 to provide cooling for the power machine. As noted above, some embodiments may include additional or alternative hydraulic work components arranged to be powered by a hydraulic charge pump and thereby provide a hydraulic load on the hydraulic charge pump circuit 300.

The charge relief valve 308 is situated between the output of the fan motor 306 and the tank 302 and can be formed and structured similarly to other pressure relief valves known in the art. Generally, as also noted above, the charge relief valve 308 can be used to set a threshold pressure at which flow from the hydraulic charge pump 304 is provided to the associated hydraulic drive circuit. As mentioned above, the charge relief 308 can be integrated into hydrostatic drive pump assembly 320, or can be otherwise arranged. The fan motor 306 and the charge relief valve 308 collectively represent a load on the hydraulic charge pump 304. In various embodiments, other components can be part of a load on the hydraulic charge pump 304.

A bypass line 312 extends from a junction that is between the hydraulic charge pump 304 and the fan motor 306 and provides a route for flow that bypasses the fan motor 306 (or other hydraulic work component) and the charge relief valve 308 to the tank 302. The charge bypass valve 310 is arranged to control flow along the bypass line 312 and thereby control whether flow from the hydraulic charge pump 304 bypasses its load. In the illustrated embodiment, the charge bypass valve 310 is arranged along the bypass line 312, although other configurations are possible.

Generally, a charge bypass valve can be configured as any number of known types of valves that can selectively control flow along a flow line, including hydraulically actuated valves or electrically actuated valves, as appropriate. For example, in the illustrated embodiment, the charge bypass valve 310 is configured as an electrically-controlled two-position valve. A first, default position of the valve 310 blocks the flow of hydraulic fluid through the charge bypass valve 310 and into the tank 302, and a second, actuated position allows the flow of hydraulic fluid through the charge bypass valve 310 and into the tank 302. Thus, based on control signals from the controller 314, the charge bypass valve 310 can control whether flow from the hydraulic charge pump 304 is directed through the fan motor 306 to charge a hydraulic drive circuit, or is directed along the bypass line 312 to flow directly back to the tank 302. In some embodiments, other arrangements can similarly control whether flow from a hydraulic charge pump is directed to a fan motor or other hydraulic load, or is temporarily directed to bypass the load(s).

A controller can be configured to receive any number of different inputs and input types to control a charge bypass valve. For example, as also noted above, the controller 314 is in communication with sensors 316 and is also configured to receive other non-sensor decision inputs 318. Generally, relevant sensors can be disposed internally or externally to a power machine and can exhibit any variety of known configurations. For example, the sensors 316 can variously include temperature sensors (e.g., thermocouples, thermistors, etc.) that are configured to sense ambient temperature, temperature of hydraulic fluid, or other temperatures, as engine speed sensors, as electrical sensors relating to operator inputs (e.g., at an engine crank button or operator ignition switch) and so on. Data from sensors, as well as other decision inputs 318, can be routed to the controller 314 using existing electrical systems of a power machine, or using various dedicated systems according to known principles of signal transmission.

As also discussed above, a bypass valve can be controlled to allow a bypass flow from a charge circuit based on a variety of different inputs or sensed operational conditions. For the purposes of the discussion below, the two different states of the bypass valve are referred to as an energized state (or that the bypass valve is energized) and a de-energized state (or that the bypass valve is de-energized). As shown in FIG. 5, the bypass valve 310 is configured (i.e., biased) so that when the valve is in the de-energized state the bypass valve is blocked to not allow fluid in the line 312 to flow to tank 302. By providing an energizing signal from the controller 314, the bias of the bypass valve 310 is overcome and the bypass valve is in an energized state, allowing flow through the line 312 to tank 302, bypassing components downstream of the line 312. As also noted above, in other embodiments, other types of valves can be used, as may sometimes result in different energized and de-energized states (with corresponding variations relative to the discussion below) but may generally still allow bypass flow to be selectively blocked or permitted.

Figure 6:
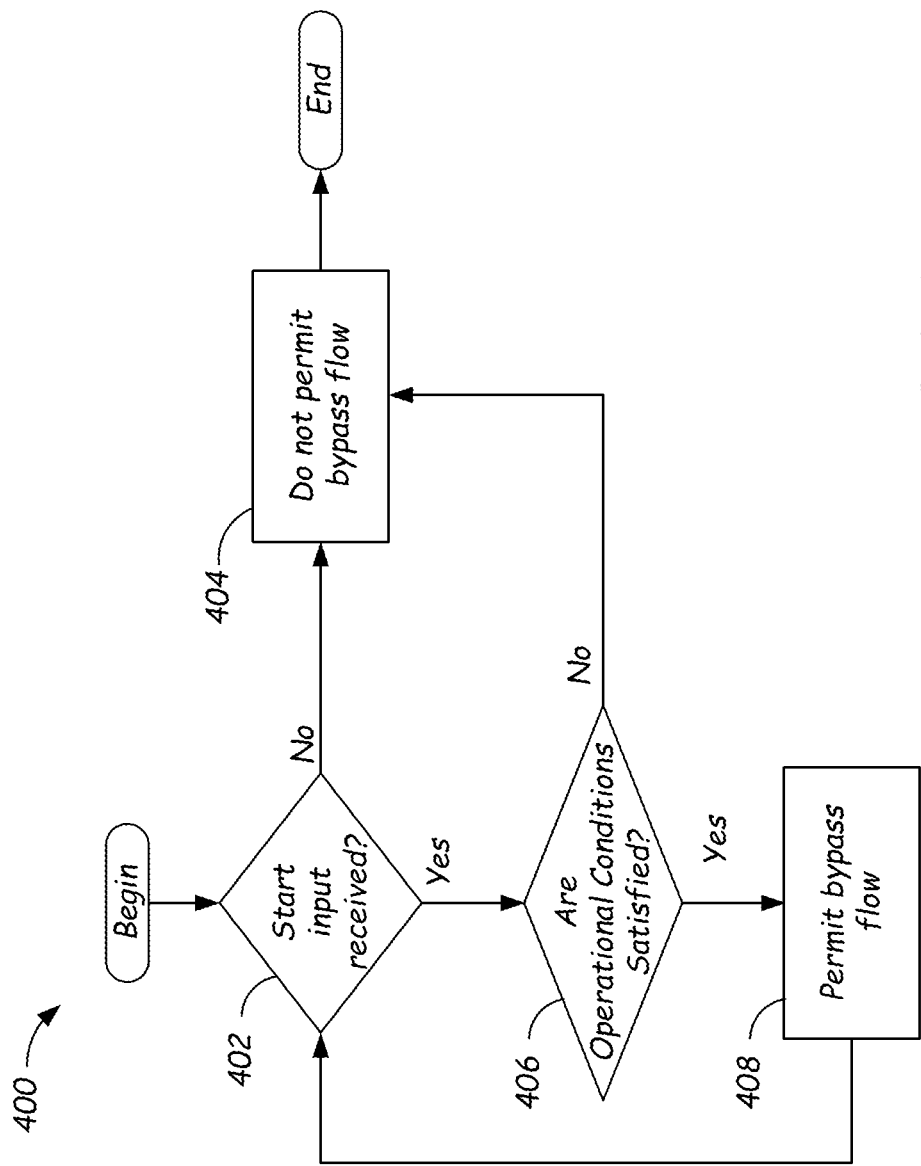
FIG. 6 shows a generalized process for controlling the operation of a charge bypass valve, including the charge bypass valve of FIG. 5.

FIG. 6 shows a generalized process 400 for controlled operation of a charge bypass valve during a starting operation, such as can be implemented for the charge bypass valve 310 using the controller 314 or for other bypass systems according to this disclosure. As discussed above, the default state of the charge bypass valve 310 is to be not energized, meaning that pressurized hydraulic fluid is not allowed to flow through line 312 to tank 302. Due to the nature of the hydrostatic drive circuit, it is not advantageous to have the charge bypass valve 310 energized for any but a short period of time and specifically during a starting operation to minimize the likelihood that damage to the hydrostatic pumps will occur. FIG. 6 illustrates when the bypass valve 310 is to be energized under process 400, with the understanding that in other conditions (e.g., all other conditions), the charge bypass valve would not be energized.

The process 400 can best be understood by referring both to the flowchart in FIG. 6 and the hydraulic circuit in FIG. 5. At block 402, the process 400 determines whether a start input has been received from an operator. In some embodiments, this determination is made by analyzing a start input signal (one of the decision inputs 318) provided to the controller 314. The start input signal can take many forms. For example, it can be a simple voltage input, a serial communication input from a separate controller on board a power machine, or even a signal from remote device. Further, the start input may be a momentary input such that the controller may enter a start sequence that will continue for a certain amount time or until the controller determines that engine is started or won't start.

For the purposes of this discussion, the inquiry in block 402 is satisfied whenever the starting sequence is enabled. That is, the enabling of the starting sequence in these cases is generally interpreted as corresponding to a received start input a block 402 under process 400, even in cases where the controller controls an extended starting sequence in response to a momentary start input. In addition, in some cases where a start input is being provided continuously, if a controller on the machine can determine that the machine has been successfully started, the inquiry in block 402 will not be satisfied even if the start input remains in effect (e.g., even if the operator continues to depress a start switch after the engine is fully started). This may help to prevent execution of a bypass operation when an operator attempts to start a power machine, or continues to attempt to start the power machine, after it is already running.

If the controller 314 determines that the operator is not attempting to start the machine, the process moves to block 404 where the control system operates so as not to permit bypass flow. For example, at block 404 the controller 314 may de-energize the bypass valve 310 (e.g., stop energizing, actively de-energize, or continues not to energize the bypass valve 310), thereby stopping (or continuing not to allow) a bypass flow, and the process ends.

If the controller 314 determines that an operator is attempting to start the machine, the process moves to block 406 to determine whether certain operational conditions are satisfied. As discussed below, in various embodiments, different operational conditions are analyzed. If the operational conditions are not satisfied, the process moves to block 404 where, as noted above, the control system operates so as to not to permit bypass flow. For example, the controller 314 may de-energize the bypass valve 310 and the process ends. If, however, the operational conditions are satisfied, the process moves to block 408, where the control system operates so as to permit bypass flow. For example, the bypass valve 310 can be energized via a signal from the controller 314, thereby allowing (or continuing to allow) the bypass flow. The flowchart 400 in FIG. 6 shows the process moving from block 408 back to block 402 to indicate that the controller will continue to evaluate whether the start input has been received and whether the operational conditions are still satisfied. When either is not true, the process will move to block 404 and de-energize the bypass valve. In various embodiments, the specific implementation of controller 414 can accomplish this process in various ways, including as based on different combinations of operational conditions discussed herein.

FIGS. 7-13 show a variety of example implementations of methods for determining whether operational conditions considered in block 406 of method 400 are satisfied. Each of these methods can be implemented an embodiment of block 406 of method 400, or can be implemented as part of other processes for control of bypass flow. Further, although particular operations within any one of the methods in the various FIGs. are illustrated in a particular order, any given set of operations (e.g., decision analyses) can generally be executed in reversed or otherwise different orders, including in parallel, and can be executed in any number of combinations, as generally discussed above and below.

Figure 7:
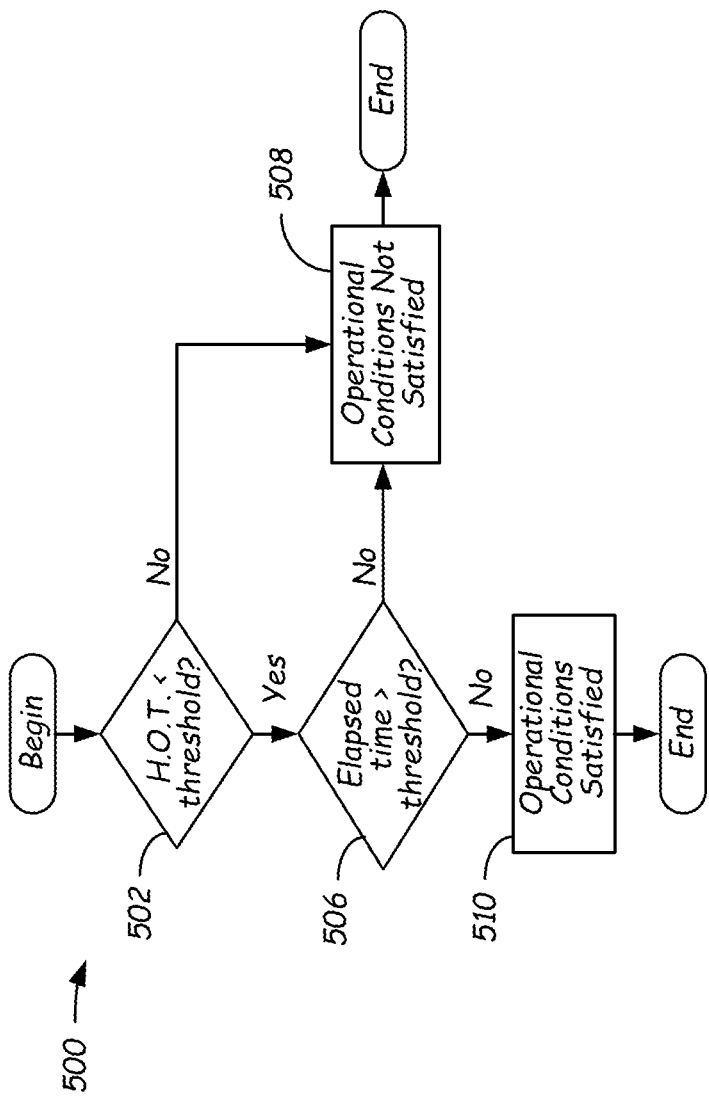
FIGS. 7-13 show example implementations of aspects of the process of FIG. 6 for controlling the operation of a charge bypass valve during a starting operation.

In FIG. 7, a method 500 includes consideration of hydraulic oil temperature, measured (or otherwise determined) engine speed, and the amount of time that has elapsed since receiving a start input. At block 502, the controller 314 determines whether the hydraulic oil temperature is below a threshold temperature. If the temperature of the hydraulic oil is not determined to be below the threshold temperature, the method moves to block 508, where the operational conditions are deemed to be not satisfied. The threshold temperature can be selected so that above the threshold, the viscosity of the oil is such that it will not substantially inhibit the ability of the machine to start. In some cases, a threshold temperature can be −10° C., although other values are also possible.

If the hydraulic oil temperature is below the pre-defined threshold (or in a different order, as appropriate), the method moves to block 506, where the controller 314 determines whether the time that has elapsed since the start input has been received is greater than a relevant (e.g., pre-determined) threshold. The time threshold can be selected to ensure that the bypass flow is not permitted for a long enough period as may result in damage to associated components such as the hydrostatic drive pumps. For example, a threshold elapsed time may be 5 seconds, 10 seconds, 30 seconds, or an interval between any two of 5 seconds, 10 seconds, or 30 seconds (inclusive of these endpoints). Correspondingly, if the elapsed time is greater than the threshold, the method moves to block 508, determining that the operational conditions are not satisfied, and the method ends. If, however, the elapsed time is not greater than the threshold, the method moves to block 510, where the operational conditions are deemed to be satisfied and the method ends. As generally noted above, some alternatives can include processing at blocks 502, 506 in different orders or in parallel, or can include approaches that evaluate operational conditions based on processing at only one of blocks 502, 506.

Figure 8:
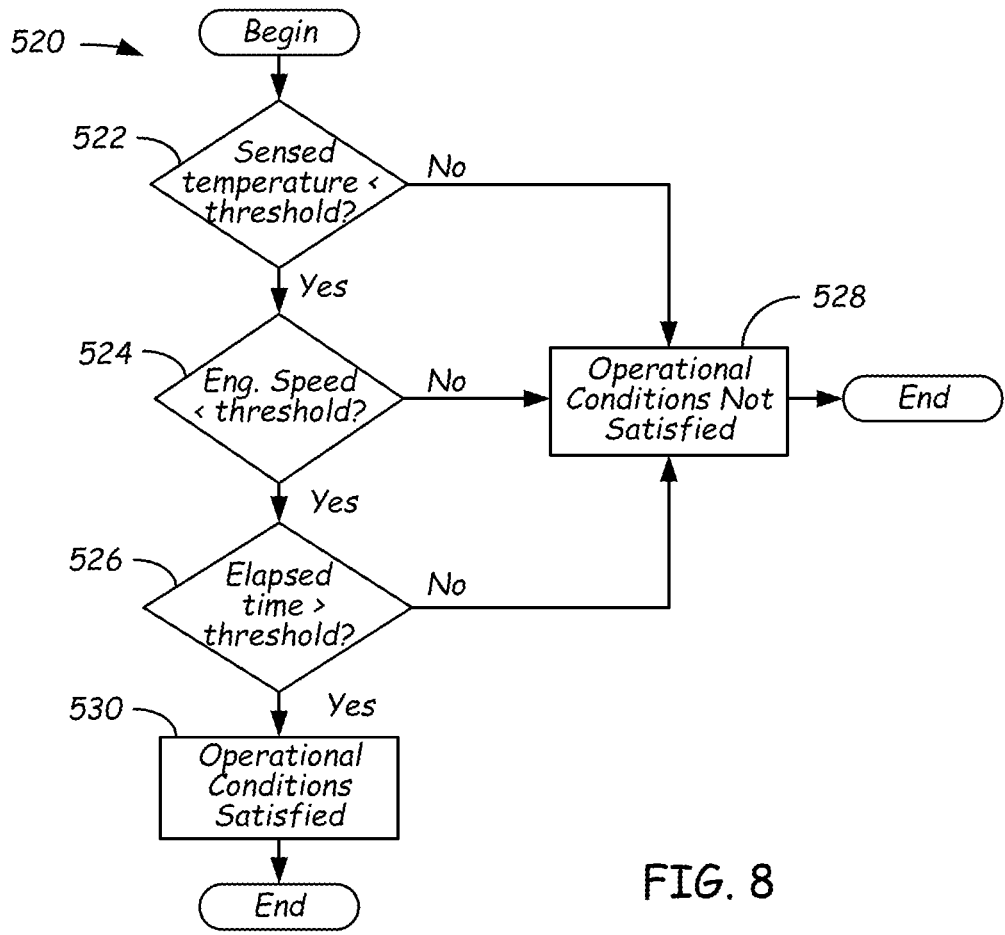

In FIG. 8, a method 520 includes consideration of an ambient temperature, an engine speed, and the amount of time that has elapsed between a previous (e.g., most recent) run cycle and the current run cycle. In some embodiments, the ambient temperature is measured with sensors at an intake of the engine. In other embodiments, the ambient temperature is measured in other locations. At block 522, the controller 314 determines whether the sensed ambient temperature is below a threshold temperature. If the sensed ambient temperature is not determined to be below the threshold temperature, the method moves to block 528, where the operational conditions are deemed to be not satisfied. The threshold temperature can be selected so that above the threshold, the engine is likely to start without energizing the bypass valve. In some cases, a threshold temperature can be −10° C., although other values are also possible. Similarly, although it may be appropriate in some cases to use the same threshold temperatures relative to ambient temperature and other temperatures (e.g., of hydraulic fluid), in other cases threshold temperatures relative to temperature measurements at different components or systems may vary.

If the sensed ambient temperature is below the relevant (e.g., pre-defined) threshold, the method moves to block 524, where the controller 314 determines whether the engine speed is below a relevant (e.g., pre-determined) threshold. The engine-speed threshold can be advantageously set at a speed indicative of the engine being successfully started. For example, a threshold engine speed can be 900 RPM, although other values are also possible. If the engine speed is above the threshold, the engine has likely been successfully started and, correspondingly, no reason may exist to continue to energize the bypass valve. Thus, the operational conditions for energizing the bypass valve would not be satisfied and the method moves to block 528 indicating that operational conditions are not satisfied and the method then ends.

If the engine speed is determined to be below the threshold, the method moves to block 526. At block 526, the controller 314 determines whether the time that has elapsed since the previous run cycle is greater than a relevant (e.g., pre-determined) time threshold. The time threshold can be selected to identify an amount of time where residual heat from the last run cycle will allow the engine to reliably start, even if a machine at or near the ambient temperature may have difficulty starting without the bypass valve being energized. Correspondingly, in some cases, an elapsed time threshold relative to successive run cycles can be 1 hour, 2 hours, or any number of times therebetween, although other values are also possible.

In some cases, a time threshold can be a predetermined time or time interval. In some cases, a time threshold can be determined based on other factors, including a duration of time of a previous run cycle, a shut-down temperature of a power machine for a previous run cycle, a current or previous ambient temperature, or a relevant temperature profile. In some cases, an elapsed time threshold can be determined based on an inverse relationship (e.g., a negative linear relationship) with ambient or system temperature. For example, an elapsed time threshold of 1 or 2 hours may be determined as a baseline threshold, with a linear reduction in that time (e.g., of a predetermined slope), based on the current ambient temperature, an average ambient temperature over the current elapsed time interval, or another factor.

Continuing, with respect to FIG. 8, if the elapsed time is not greater than the threshold, the method moves to block 528, where the operational conditions are determined to be not satisfied, and the method ends. If, however, the elapsed time is greater than the relevant threshold, the method moves to block 530, where the operational conditions are deemed to be satisfied and the method ends. As generally noted above, some alternatives can include processing at blocks 522, 524, 526 in different orders or in parallel, or can include approaches that evaluate operational conditions based on processing at only one of blocks 522, 524, 526.

Figure 9:
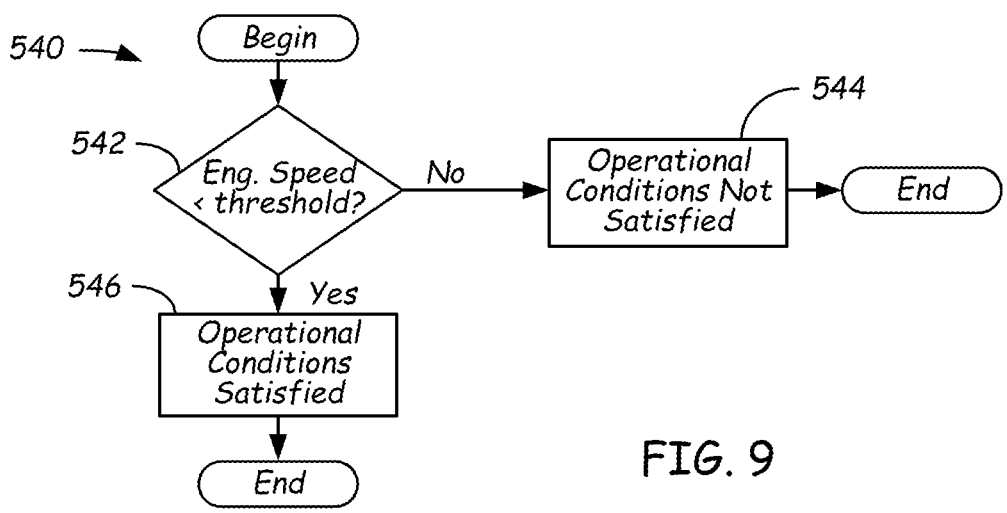

In FIG. 9, a method 540 includes consideration solely of a measured engine speed. At block 542, the controller 314 determines whether the engine speed is below a speed threshold. The speed threshold can be advantageously set at a speed indicative of the engine being successfully started. If the engine speed is determined to be above the threshold at block 542, the engine has likely been successfully started and that, accordingly, no reason may exist to continue to energize the bypass valve. Thus, the method moves to block 542, indicating that operational conditions are not satisfied, and the method then ends. If the engine speed is determined to be below the speed threshold, the method moves to block 546 where the operational conditions are deemed to be satisfied and the method ends.

Figure 10:
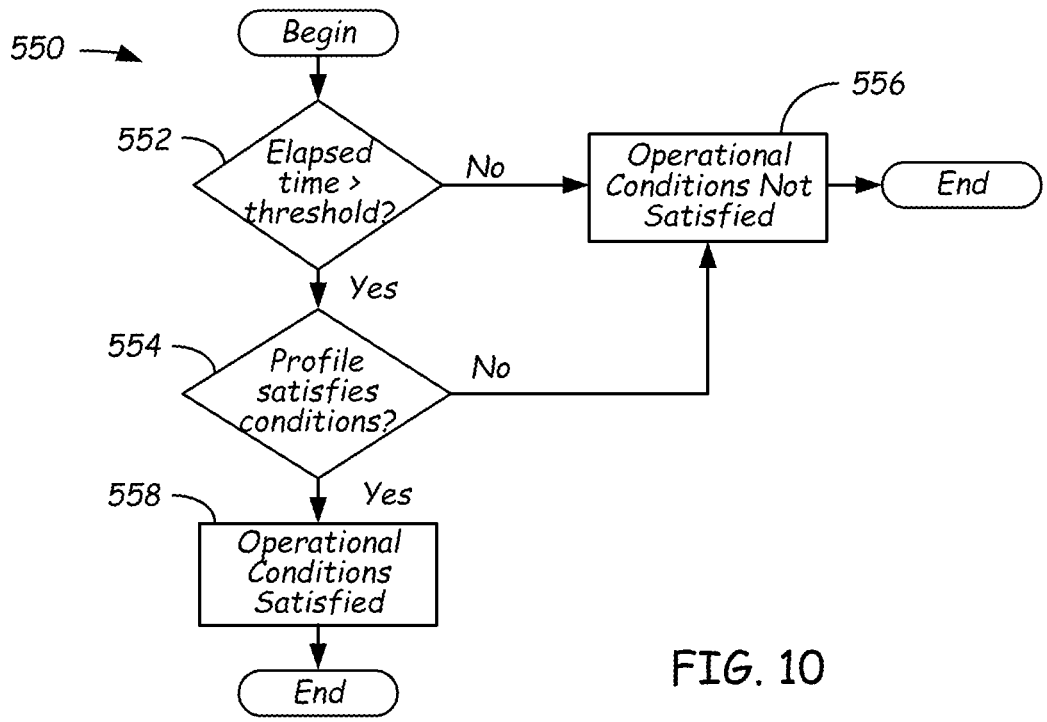

In FIG. 10, a method 550 includes consideration of a length of time since a previous run cycle and a temperature profile since the previous run cycle. At block 552, the controller 314 determines whether the time that has elapsed since the last run cycle is greater than a relevant (e.g., pre-determined) threshold. The time threshold can be selected to identify an amount of time where residual heat from the last run cycle will allow the engine to reliably start, even if the ambient temperature is such that a machine at the ambient temperature may have difficulty starting without the bypass valve being energized. For example, an elapsed time threshold can be 1 hour, 2 hours, or any number of times therebetween, although other values are also possible. If the elapsed time is less than the threshold, the method moves to block 556, indicating that the operational conditions are not satisfied, and the method ends.

If the elapsed time is greater than the threshold, the method moves to block 554 and a temperature profile is analyzed. The temperature profile in some embodiments can include data indicating multiple temperatures since the last run cycle. Some of the temperatures that may be considered in the temperature profile include temperatures of engine coolant, hydraulic fluid, an ambient environment, or any combination thereof. Such data may be collected, stored, and/or analyzed in any suitable manner, including by the controller 314, one or more of the sensors 316, or any other suitable controller or system. If the result of the temperature analysis indicates that the temperature profile is likely to result in difficulty starting the engine, the method moves to block 558 and the operational conditions are considered satisfied. If, however, the analysis of the temperature policies indicates that the temperature profile is not likely to result in difficulty starting the engine, the method moves to block 556, indicating that the operational conditions are not satisfied, and the routine ends. In this regard, for example, operational conditions may be determined to be satisfied if any fluid temperature within a power machine has fallen below, or has an average below, −10° C. since the last run cycle, or if ambient temperature has fallen below, or has an average below, −10° C. since the last run cycle, etc.

Still referring to FIG. 10, in some embodiments, a similar process can be implemented in which, at block 552, the controller 314 evaluates operational conditions based on a different time threshold or a different elapsed time. For example, the controller 314 may determine whether a duration of runtime for a previous run cycle is below a particular time threshold, such as may be selected to correspond to an amount of time over which hydraulic fluid may have been sufficiently warmed to avoid excess loading of the engine during startup. In some such cases, the process 550 can include determining whether the operational conditions are satisfied solely on the basis of the duration of time of the previous run cycle. In other cases, the process 550 can further include consideration (e.g., at block 554) of whether a temperature profile or current (e.g., ambient) temperature satisfies a particular condition (e.g., is below a threshold temperature) or can include consideration (e.g., also at block 552) of whether an elapsed time since the previous run cycle exceeds another particular time threshold. Similarly, and as generally noted above, some alternatives can include processing at blocks 552, 554 in different orders or in parallel, or can include approaches that evaluate operational conditions based on processing at only one of blocks 552, 556.

In some embodiments, for the process 550 and others, one time or temperature threshold (or temperature profile characteristic) can be identified based on another time or temperature value. For example, a time threshold for an elapsed time between a previous and current run cycle can sometimes be determined based on a duration of time of the previous run cycle, a current ambient (or other) temperature, or a temperature profile between the previous and current run cycles.

Figure 11:
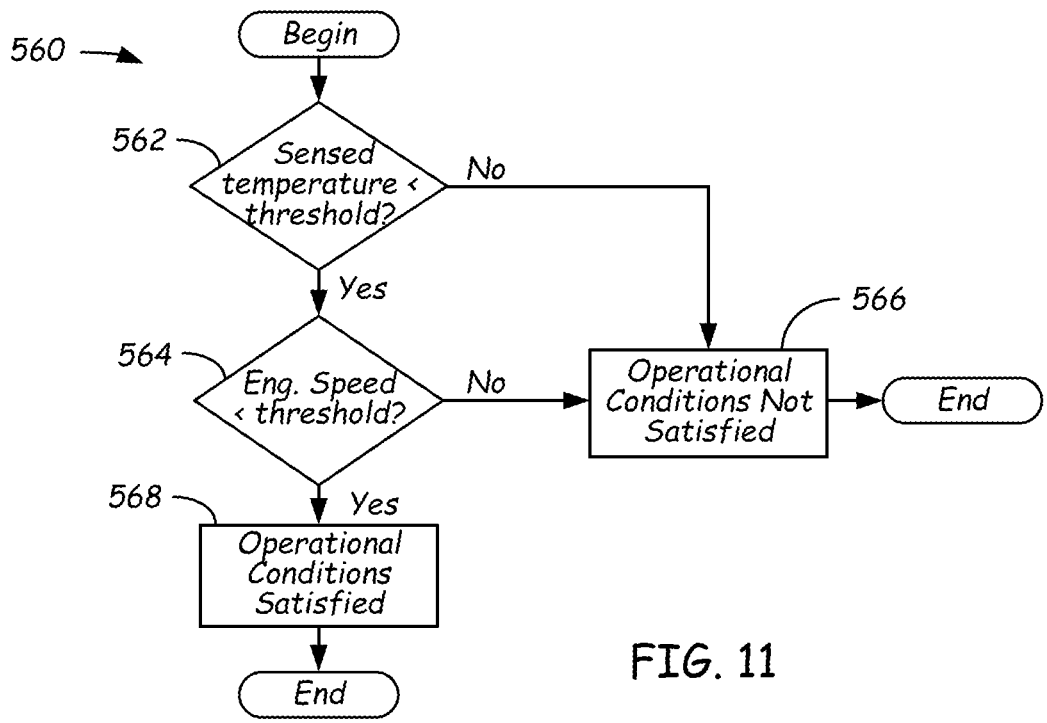

In FIG. 11, a method 560 includes consideration of a temperature of a component on the machine and an engine speed. In various embodiments, the temperature can be measured (e.g., by the sensors 316) at any of a number of components on the machine. For example, temperatures can be sensed at any one or more of a hydrostatic pump, a hydraulic pump, a hydraulic fluid reservoir, an oil cooler, a drive motor, a valve, a hose, a tubeline, or a variety of other components. At block 562, the controller 314 determines whether the sensed component temperature is below a threshold temperature. If the sensed component temperature is not determined to be below the threshold temperature, the method moves to block 566, where the operational conditions are deemed to be not satisfied. As similarly discussed above, the threshold temperature can be selected so that above the threshold, the engine is likely to start without energizing the bypass valve. For example, a threshold temperature of −10° C. may be appropriate for some implementations.

If the sensed component temperature is below the threshold temperature, the method moves to block 564, where the controller 314 determines whether the engine speed is below a relevant (e.g., pre-determined) threshold. As also noted above, the speed threshold can be advantageously set at a speed indicative of the engine being successfully started. Correspondingly, if the engine speed is above the threshold, the engine has likely been successfully started and, accordingly, no reason may exist to continue to energize the bypass valve. Thus, the operational conditions for energizing the bypass valve would not be satisfied and the method moves to block 566, and the method then ends. If, however, the engine speed is determined to be above the speed threshold, the method moves to block 566, where the operational conditions determined to be not satisfied, and the method ends. If the engine speed is determined to be below the speed threshold, the method moves to block 568, where the operational conditions are deemed to be satisfied and the method ends. As generally noted above, some alternatives can include processing at blocks 562, 564 in different orders or in parallel, or can include approaches that evaluate operational conditions based on processing at only one of blocks 562, 564.

Figure 12:
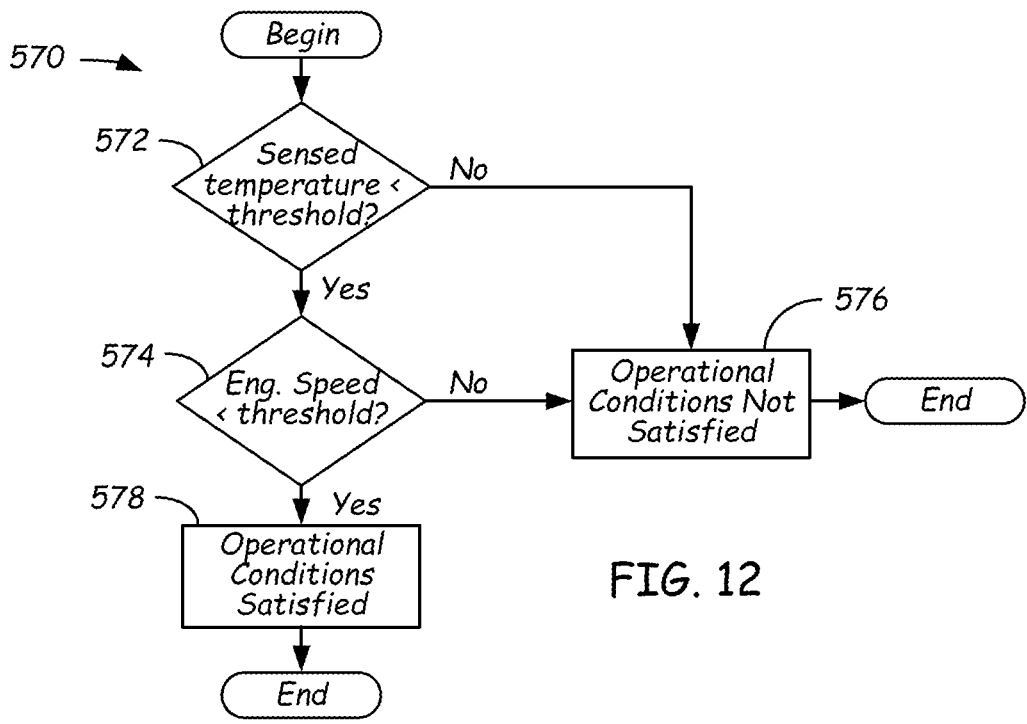

In FIG. 12, a method 570 includes consideration of a hydraulic oil temperature (e.g., outside of a charge circuit on the machine) and an engine speed. In various embodiments, the oil temperature can be measured at any of a number of locations on the machine (e.g., at any of the relevant components listed above). At block 572, the controller 314 determines whether the sensed hydraulic oil temperature is below a threshold temperature. If the sensed hydraulic oil temperature is not determined to be below the threshold temperature, the method moves to block 576, where the operational conditions are deemed to be not satisfied and the method ends. As similarly discussed above, the threshold temperature can be selected so that above the threshold, the engine is likely to start without energizing the bypass valve. For example, a threshold of −10° C. may be appropriate in some cases.

If the sensed component temperature is below the temperature threshold, the method moves to block 574, where the controller 314 determines whether the engine speed is below a relevant (e.g., pre-determined) threshold. The speed threshold can be advantageously set at a speed indicative of the engine being successfully started. If the engine speed is above the threshold, the engine has likely been successfully started and, correspondingly, no reason may exist to continue to energize the bypass valve. Thus, the method moves to block 576 indicating that operational conditions are not satisfied and the method then ends. If, however, the engine speed is determined to be below the threshold, the method moves to block 578, where the operational conditions are deemed to be satisfied and the method ends. As generally noted above, some alternatives can include processing at blocks 572, 574 in different orders or in parallel, or can include approaches that evaluate operational conditions based on processing at only one of blocks 572, 574.

Figure 13:
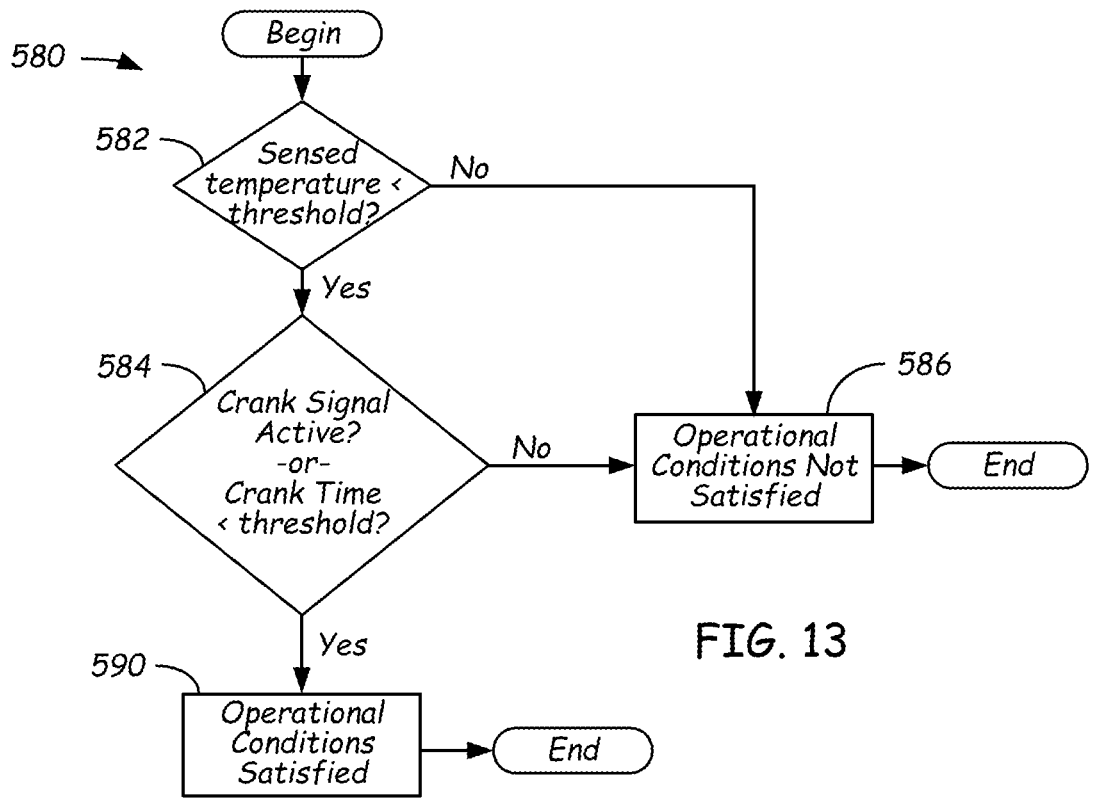

In FIG. 13, a method 580 includes consideration of a temperature of a component (or fluid) on the machine and aspects of a cranking signal or related operation to start the engine. In various embodiments, the temperature can be measured (e.g., by the sensors 316) at any of a number of components on the machine or at any number of fluid locations. At block 582, the controller 314 determines whether the sensed temperature is below a threshold temperature. If the sensed component temperature is not determined to be below the threshold temperature, the method 580 moves to block 586, where the operational conditions are deemed to be not satisfied. As similarly discussed above, the threshold temperature can be selected (e.g., as −10° C.)

so that at temperatures above the threshold the engine is likely to start without energizing the bypass valve.

If the sensed temperature is below the threshold temperature, the method moves to block 584, where the controller 314 determines a status of a cranking operation of the engine. In different implementations, a status of a cranking operation can be determined based on one or more different factors. As one example, the controller 314 can determine whether an operator-generated crank signal is active based on detection of an electrical or other signal that corresponds to the actuation of a "start engine" button, switch, or other similar operator interface. As another example, the controller 314 can determine if the duration of the current cranking operation for the engine is below a cranking time threshold. In some cases, a cranking time threshold can be determined as a maximum time during which bypass flow may be acceptable if detrimental effects from a lack of charge (and cooling) hydraulic flow, from non-operation of a fan motor, or from other related factors are to be appropriately avoided. For example, in some cases, a cranking time threshold may be set as 5 seconds, 10 seconds, 30 seconds, or a value between any two of those endpoints, although other thresholds are also possible.

If the controller 314 determines that an a cranking operation has progressed sufficiently (e.g., has progressed for long enough or is no longer active), including as based on the factors discussed above, the method 580 can move to block 586, where the operational conditions are deemed to be not satisfied. If, however, the controller 314 determines that the cranking operation has not progressed sufficiently (e.g., that a crank signal is still active or that a cranking time threshold has not been met), the method 580 moves to block 590, where the operational conditions are deemed to be satisfied and the method 580 ends. As generally noted above, some alternatives can include processing at blocks 582, 584 in different orders or in parallel, or can include approaches that evaluate operational conditions based on processing at only one of blocks 582, 584.

Although the example methods above evaluate particular combinations of operational parameters to determine whether relevant operational conditions are satisfied, other combinations are possible. For example, any one or more of an engine speed, an elapsed time, a component temperature, a fluid temperature, an ambient temperatures, or a temperature profile can be considered alone or in combination to determine whether a bypass flow should be allowed (e.g., using threshold values or other approaches detailed above). Similarly, a particular threshold or other condition for any particular operational parameter can be specified as a predetermined value or as a predetermined range or table of values, or can be determined based on a value of one or more other operational parameters. For example, as also noted above, temperature thresholds can sometimes be determined based on time interval thresholds and vice versa.

As another example, a threshold temperature or time interval may be determined based on the location or nature of a relevant component, recognizing that some components may cool more or less quickly than others. For example, cooling may occur more quickly for components located near or exposed to the exterior of a power machine, including drive motors for compact track loaders, as well as for components with relatively low mass or relatively high surface area, including tubelines. Correspondingly, threshold temperatures may sometimes be reduced for these components as compared to other components, particularly with respect to short time intervals between run cycles.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general-purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Although the present invention has been described by referring preferred embodiments, workers skilled in the art will recognize that changes may be made in form and detail without departing from the scope of the discussion.

What is claimed is:

1. A power machine comprising:
an engine;
a hydrostatic drive system including a hydraulic charge pump circuit that includes a hydraulic load and a tank;
a hydraulic charge pump in fluid communication with the hydraulic charge pump circuit;
a bypass line extending to the tank from a junction between the hydraulic charge pump and the hydraulic load;
a charge bypass valve arranged to control flow through the bypass line; and
a control system comprising a control device configured to:
determine an engine speed for the engine;
determine an elapsed time between a current run cycle and a previous run cycle, for one or more of the hydrostatic drive system and the engine; and
control the charge bypass valve to allow flow through the bypass line, from the hydraulic charge pump to the tank, based on the engine speed being below a speed threshold and the elapsed time being greater than a time threshold.

2. The power machine of claim 1, wherein the control device is further configured to:
determine one or more of an ambient temperature or a temperature of the power machine; and
control the charge bypass valve to allow flow through the bypass line, from the hydraulic charge pump to the tank, further based on the determined temperature being below a temperature threshold.

3. The power machine of claim 1, wherein the control device is further configured to:
determine one or more of an ambient temperature or a temperature of the power machine; and
determine the time threshold based on the determined temperature.

4. The power machine of claim 3, wherein the hydraulic load is a motor.

5. The power machine of claim 4, wherein the charge bypass valve is a two-position, default closed, controllable valve.

6. A control system for a hydrostatic drive system, for use in a power machine with an engine, the hydrostatic drive system including a hydrostatic drive pump and a hydraulic charge pump circuit that includes a hydraulic load, a hydraulic charge pump in fluid communication with the hydraulic charge pump circuit and a tank, a bypass line extending to the tank from a junction between the hydraulic charge pump and the hydraulic load, and a charge bypass valve arranged to control flow through the bypass line, the control system comprising:
a control device configured to:
determine one or more operational parameters for the power machine, the one or more operational parameters including:
a temperature profile associated with the power machine between a current run cycle and a previous run cycle; and
an elapsed time between the current run cycle and the previous run cycle; and
during a startup of the engine, control the charge bypass valve to allow flow through the bypass line, to bypass the hydraulic load and the hydrostatic drive pump, for a flow from the hydraulic charge pump to the tank, based on the determined one or more operational parameters, including based on the temperature profile and the elapsed time.

7. The control system of claim 6, wherein the one or more operational parameters include:
a fluid temperature of hydraulic fluid within one or more of the hydraulic charge pump circuit or the hydrostatic drive system; and
a duration of a current cranking operation for the engine; and
wherein the control device is configured to control the charge bypass valve to allow flow through the bypass line based on:
the fluid temperature being below a temperature threshold; and one or more of:
the duration of the current cranking operation being below a cranking time threshold; or
an operator-generated crank signal being active.

8. The control system of claim 6, wherein the temperature profile includes temperature data for one or more of the hydrostatic drive system or the engine.

9. The control system of claim 6, wherein the temperature profile includes temperature data for one or more of: an engine coolant for the engine, a hydraulic fluid, or an ambient environment.

10. The control system of claim 6, wherein the one or more operational parameters include an engine speed of the engine; and
wherein the control device is configured to control the charge bypass valve to allow flow through the bypass line based on the engine speed being below a speed threshold.

11. The control system of claim 10, wherein the one or more operational parameters further include a temperature of a component of the power machine; and
wherein the control device is configured to control the charge bypass valve to allow flow through the bypass line further based on the temperature being below a temperature threshold.

12. The control system of claim 10, wherein the one or more operational parameters further include a fluid temperature of hydraulic fluid of the power machine; and
wherein the control device is configured to control the charge bypass valve to allow flow through the bypass line further based on the fluid temperature being below a temperature threshold.

13. The control system of claim 12, wherein the fluid temperature is of hydraulic fluid outside of the hydraulic charge pump circuit.

14. A method for controlling a bypass flow for a hydraulic charge pump circuit of a power machine, the method comprising:
determining, using a control device, one or more operational parameters for the power machine; and
during a startup of the power machine, controlling a charge bypass valve, based on the one or more operational parameters, including based on a fluid temperature of hydraulic fluid within the power machine being below a temperature threshold, and based on one or more of a duration of a current cranking operation being below a cranking threshold or an operator-generated crank signal being active, to temporarily route a hydraulic flow from a hydraulic charge pump through a bypass line to a tank, to temporarily reduce hydraulic flow from the hydraulic charge pump to a hydrostatic drive system of the power machine.

15. The method of claim 14, wherein the one or more operational parameters include one or more of:
an engine speed of an engine of the power machine;
an ambient temperature;
a temperature profile associated with the power machine between a current run cycle and a previous run cycle;
a temperature of a component of the power machine;
an elapsed time between the current run cycle and the previous run cycle; or
a duration of the previous run cycle.

16. The method of claim 15, wherein the method includes controlling the charge bypass valve to temporarily route the hydraulic flow through the bypass line based on the engine speed being below a speed threshold.

17. The method of claim 16, wherein the method includes controlling the charge bypass valve to temporarily route the hydraulic flow through the bypass line further based on one or more of:
the elapsed time between the current and previous run cycles being greater than a first time threshold;
the duration of the previous run cycle being below a second time threshold; or
the ambient temperature being below a temperature threshold.

18. The method of claim 15, wherein the method includes controlling the charge bypass valve to temporarily route the hydraulic flow through the bypass line based on the temperature profile between the current and previous run cycles and the elapsed time between the current and previous run cycles.

* * * * *